May 5, 1970     O. E. SAARI     3,509,736
APPARATUS FOR TESTING IMPACT REACTION OF RESILIENT BODIES
Filed May 2, 1968     3 Sheets-Sheet 1

INVENTOR.
Oliver E. Saari
BY Barry L. Clark
Robert W. Beart
His Att'ys

INVENTOR.
Oliver E. Saari
BY Barry L. Clark
Robert W. Beart
His Att'ys

May 5, 1970     O. E. SAARI     3,509,736
APPARATUS FOR TESTING IMPACT REACTION OF RESILIENT BODIES
Filed May 2, 1968     3 Sheets-Sheet 3
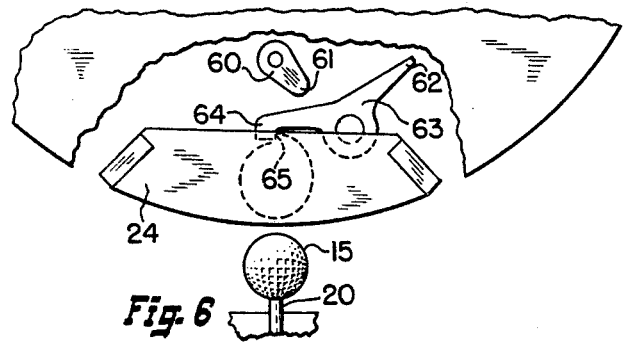
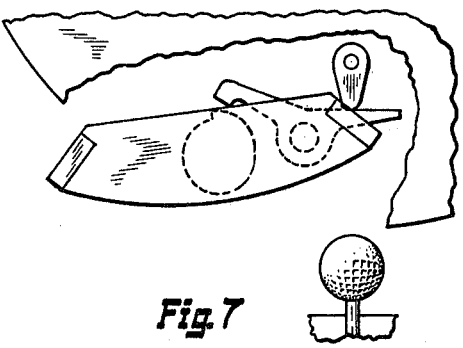
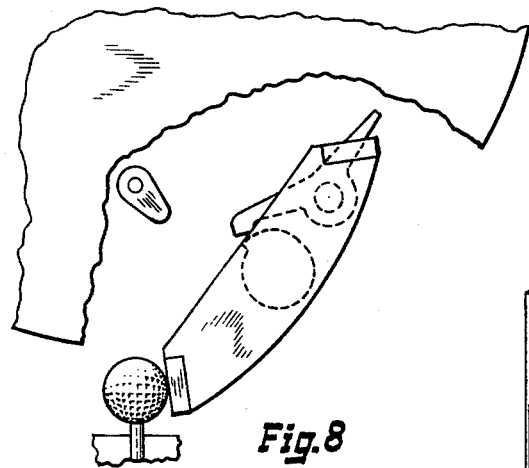
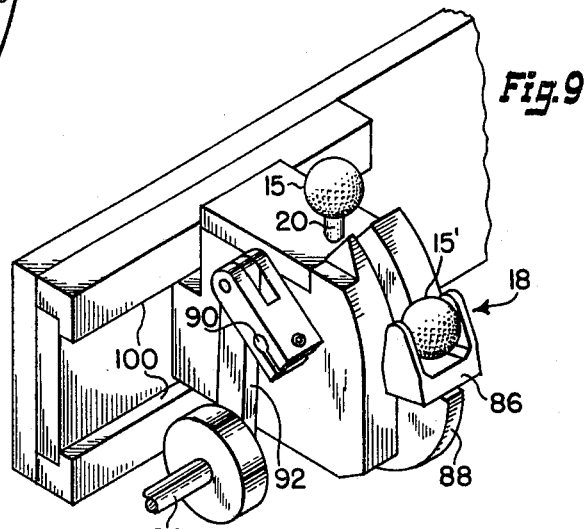
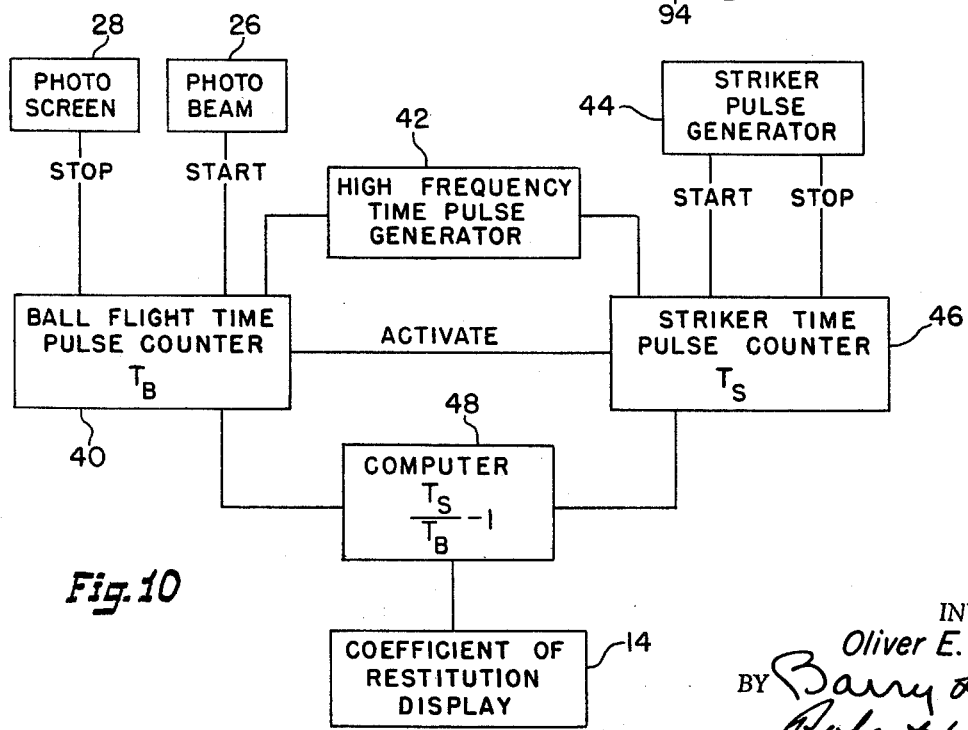
INVENTOR.
Oliver E. Saari
BY Barry L. Clark
Robert W. Beart
His Att'ys

United States Patent Office 3,509,736
Patented May 5, 1970

3,509,736
APPARATUS FOR TESTING IMPACT REACTION OF RESILIENT BODIES
Oliver E. Saari, Deerfield, Ill., assignor to United States Golf Association, New York, N.Y., a voluntary association of New York
Filed May 2, 1968, Ser. No. 726,173
Int. Cl. G01n *3/30, 3/40*
U.S. Cl. 73—13
12 Claims

ABSTRACT OF THE DISCLOSURE

Apparatus for testing reaction of a resilient body such as a golf ball to impacts applied thereto at a predetermined speed by a rotating striker member. The device measures ball and striker travel times and with the aid of a computer can immediately after testing indicate on a display either the coefficient of restitution of the ball or the speed of either the ball or the striker member. The rotating striker member and the ball are not moved into a path of contact relative to each other until just prior to impact in order to permit the ball to be held on a tee in a normal unrestrained manner.

BACKGROUND OF THE INVENTION

Field of the invention

This invention is concerned generally with a reaction testing apparatus, and more particularly with an apparatus for determining the resiliency of spherical bodies such as golf balls by measuring the coefficient of restitution of said resilient spherical bodies at a predetermined speed of impact and with the ball positioned in an unrestrained manner on a tee.

Description of the prior art

The invention relates in particular to testing apparatus of the general type disclosed in U.S. Patent 2,314,063. The testing apparatus disclosed in the aforementioned patent tests the resiliency of golf balls to assure their uniformity for tournament play. It operates by striking a ball with a rotating mass moving at a constant and non-variable speed and then either measuring its initial velocity or segregating it from the other tested balls in accordance with its relative velocity. Inasmuch as the striker member in U.S. Pat. 2,314,063 rotates at 1800 r.p.m. the balls must be moved into and positioned in the striker path in about 1/40 of a second. Because of this extremely short time interval, the ball must necessarily be moving and positively held at the point of impact rather than being freely held on a stationary tee. U.S. Pat. 3,299,692 shows a testing device wherein a ball is moved on a tee into position to be struck by a rotating striker element. Although this latter patent does not state at what velocity the balls are struck, it would necessarily be much lower than that possible with the present invention, or the invention disclosed in U.S. Pat. 2,314,063, since the tee must be lifted quite slowly to retain the ball in position.

SUMMARY OF THE INVENTION

With the continual developments which have taken place in golf ball design, it has become more and more desirable to be able to accurately test the resiliency of a golf ball when driven at a predetermined velocity from an unrestrained position on a tee and preferably, at a plurality of impact velocities rather than only one. The advantages of testing at different velocities is readily evident when it is realized that the coefficient of restitution (a value indicative of a ball's resilience) varies with the velocity of impact, generally getting lower as the velocity of the club head increases.

In order to more closely control conditions of play it is desirable for the manufacturers and the organizations sponsoring tournaments to be able to known and thereby be able to control the resiliency characteristics of a ball at any velocity at which it may be hit so that its properties may be standardized. By maintaining control over ball standards, the game can be kept more fair.

It is, therefore, a primary object of this invention to provide an apparatus for determining the reaction of spherical resilient bodies to impacts applied at a predetermined fixed velocity or over a range of velocities in a manner which simulates natural conditions.

It is another object of this invention to provide an apparatus for computing the coefficient of restitution or the velocity of a spherical resilient body at a plurality of impact velocities and indicating the value of said coefficient immediately after impact.

Yet another object of this invention is to provide a golf ball testing apparatus which supports the ball to be tested on a tee in an unrestrained manner.

Still another object of this invention is to provide a rotating striker device including a striker member which is movable outwardly of the device during rotation and just prior to striking a ball to permit the ball to be placed on a tee and brought to rest before the striker member is triggered to fire the ball.

A further object is to provide a ball testing apparatus wherein the path assumed by the ball after impact can be adjusted to correct for changes in trajectory caused by variations in striker speed.

A still further object is to provide a golf ball testing apparatus wherein balls of different diameter can be tested.

The apparatus of the present invention incorporates a retractable striker member and a device for moving balls to a tee. It further utilizes a light beam and light screen positioned apart a predetermined distance equal to the circumference of the path of the striker. A measurement of the time required for the ball to move between the light beam and screen and for the striker to make one revolution enables the coefficient of restitution of the ball to be directly and easily computed by a simple computer for any velocity of impact and then displayed immediately.

A principal advantage of the invention is that it permits the accurate and instantaneous determination of factors such as coefficient of restitution and initial ball velocity which are directly related to the resiliency of a ball and its reaction to impact.

A further advantage is that the device is adaptable to a wide variety of experimental and quality control procedures as well as being easily adjustable for exact calibration to assure consistency of measurement.

An additional advantage is that the apparatus is reliable in its testing and safe in operation.

The foregoing and other objects, features and advantages of the invention will be apparent from the following more particular description of a preferred embodiment thereof, as illustrated in the accompanying drawings.

BRIEF DESCRIPTION OF THE DRAWINGS

FIG. 6 is a side elevational view of a portion of the striker release mechanism in its retracted position.

FIG. 7 is a side elevational view of a portion of the striker release mechanism at the moment the striker is released.

FIG. 8 is a side elevational view of a portion of the striker release mechanism in the position it assumes at the time of ball impact.

FIG. 9 is a perspective view of the ball loading mechanism portion of the apparatus showing a ball loaded in position and ready for firing.

FIG. 10 is a simplified schematic diagram showing the timing, counting, and computing and display operation of the invention.

DESCRIPTION OF THE PREFERRED EMBODIMENT

Figure 1:
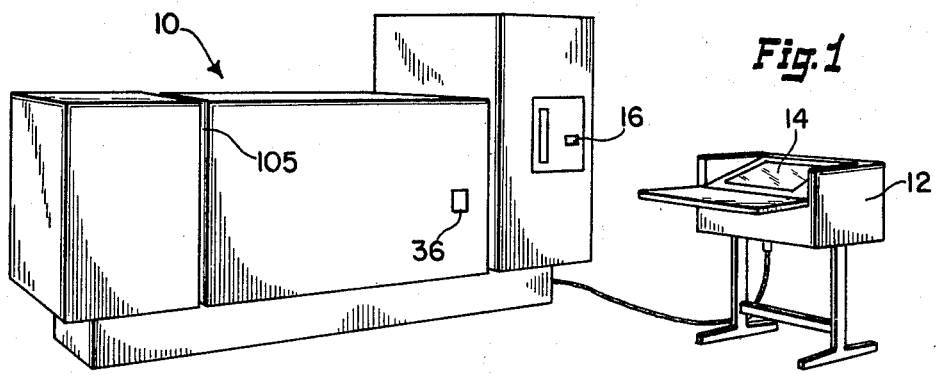
FIG. 1 is a perspective view of the external housing of an impact-reaction testing machine embodying the present invention and including an auxiliary unit for displaying the computed results of the reaction to impact measured by the testing machine.
Figure 2:
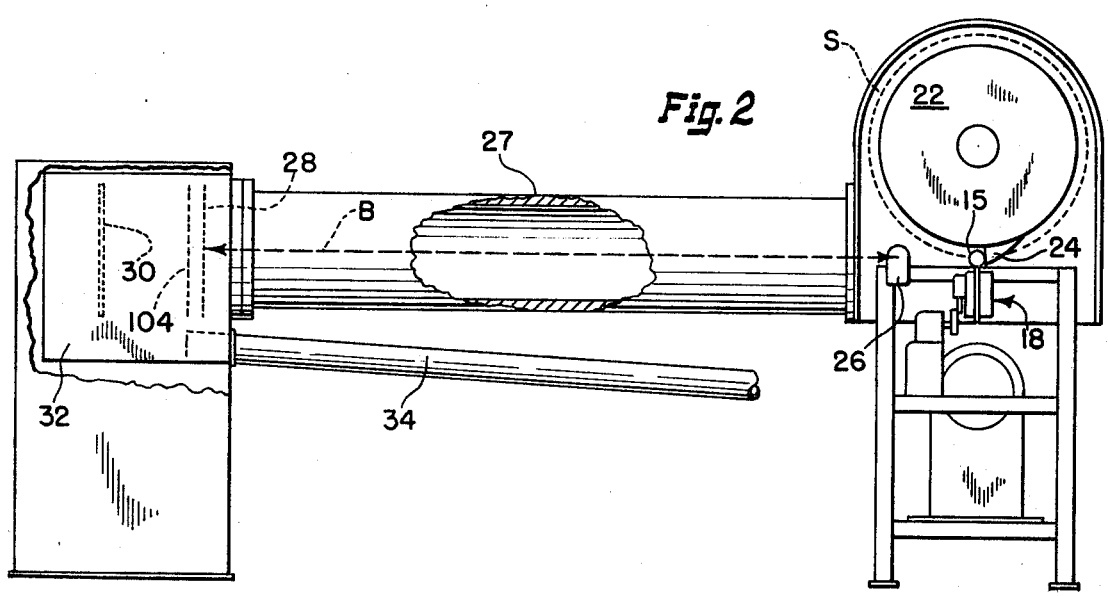
FIG. 2 is a front elevational view with the external housing removed of an impact-reaction testing machine embodying the present invention.

Referring to the drawings, a preferred embodiment of the invention will first be described generally and then specifically. Referring to FIGS. 1 and 2 for a general description, it will be seen that the working portions of the device are enclosed in an external housing indicated generally at 10. An auxiliary display unit 12 is adapted to be associated with the device and serves the function of visually displaying the coefficient of restitution or other output of the device on a readout or display screen 14.

In operation, one or more golf balls 15 to be tested are loaded through an opening 16 in the housing 10 where they are held in a feed chute (not shown) until picked up by a rotatable ball loader mechanism 18 which serves to pick up a ball and rotate it into position to be dropped on a tee 20 when a "LOAD" button (not shown) is depressed. Positioned immediately adjacent the tee is a striker wheel 22 which, during operation, is continuously rotated at any one of a plurality of predetermined speeds. When a ball 15 is in position on tee 20 a "FIRE" button (not shown) may be depressed to initiate a striker member actuating mechanism which will move the retractable striker member 24 from a retracted position out of the path of the ball into the fully extended position shown in FIG. 2. Immediately after the striker member 24 is moved into the path of the ball, it will contact the ball just placed on the tee 20 and cause it to move tangentially relative to the striker wheel and in a path where it will first intercept a beam from photocell 26 and then pass along a path B through a flight tube 27 until it passes through a light screen 28 and against a deflecting surface such as a curtain 30 in a receiving chamber 32. A return chute 34 is attached to the receiving chamber 32 and serves to permit the balls to be returned to the opening 36 to permit their removal from the machine.

As will be described hereinafter in detail, the coefficient of restitution $e$ of a ball being tested in the machine of the present invention is equal to: $T_S/T_B - 1$ where $T_B$ equals the time required by the ball to travel the distance "B" equal to the circumference of the circle "S" generated by the striker member at the point the striker engages a ball, and $T_S$ equals the time of one striker revolution. The times $T_B$ and $T_S$ are measured by counting high frequency time pulses. The computing of the coefficient of restitution is accomplished by a relatively simple computer of a type which is readily available commercially but not described since it forms no part of the present invention. In a test model, the quantities B and S were chosen equal to $2\pi$ feet so that the radius of the striker member at impact was exactly one foot. The pulse generator utilized in the test model was crystal controlled at 100,000 Hz. resulting, in an accuracy in determining the coefficient of restitution within .2%.

The sequence of operations which take place prior to display of the coefficient of restitution on screen 14 is schematically indicated in the block diagram of FIG. 10. The sequence of operations is as follows:

(1) Ball 15, after being struck by striker 24 interrupts photobeam 26 and starts ball flight time pulse counter 40 counting and conditions the striker time pulse counter 46 to permit it to be able to count. The pulses for the counters 40 and 46 are provided by a high frequency time pulse generator 42.

(2) After the "FIRE" button has been depressed and the ball has been struck by the striker member 24, the striker time pulse counter 46 will then count pulses until the striker wheel has made one revolution at which time the single pulse generator 44 coupled to the striker wheel will operate the pulse counter 46 to stop counting at a pulse count equal to $T_S$. The pulse count $T_S$ will be stored in an electronic register (not shown) where it will be available to the computer for processing.

(3) The driven ball, during step 2, will have interrupted the photoscreen 28 to cause the ball flight time pulse counter 40 to stop counting. At this point, the total pulse count, $T_B$, is established as an electrical signal suitable for computer processing.

(4) The computer 48 calculates the coefficient of restitution $e$ by dividing the striker pulse count $T_S$ by the ball flight pulse count $T_B$ and subtracting the quantity 1 therefrom $$\left( e = \frac{T_S}{T_B} - 1 \right)$$

to provide a result equal to the coefficient of restitution which it then feeds to display 14 for digital readout.

(5) The counters 40 and 46, the computer 48 and display 14 are all reset to "0" when the "LOAD" button (not shown) is pushed for the next test cycle.

Figure 3:
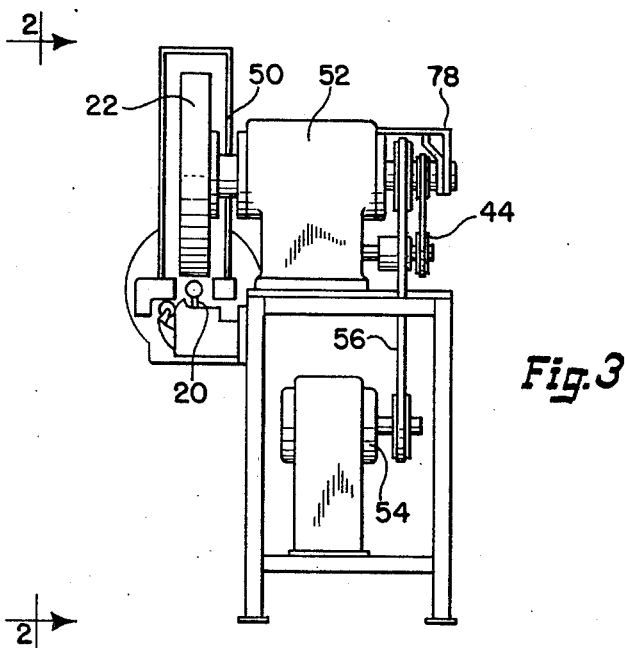
FIG. 3 is a side elevational view of the machine shown in FIG. 2.

The striker wheel 22 (FIGS. 3–5) is attached to a shaft 50 rotatably mounted in striker support housing 52. The striker shaft 50 is rotated by striker drive motor 54 by means of drive belt 56. Although a single speed motor could be used in order to make the tester more economical such a motor would restrict the usefulness of the tester. Accordingly, the striker drive motor 54 is preferably a variable speed motor capable of driving the striker member 24 and thus the ball is at any desired speed within the range of approximately 90 through 230 feet per second.

The mechanism for releasing the striker member 24 when a ball 15 has been properly loaded on the tee 20 is set forth in FIGS. 6 through 8. At all times in which the striker wheel 22 is rotating, other than the cycle of rotation wherein the ball is struck, and a second or so time interval thereafter, the striker member 24 is retracted to the position shown in FIG. 6. Once a ball has been properly loaded and the firing sequence initiated by depressing a "FIRE" button (not shown) a striker release pawl 60 is rotated from the position shown in FIG. 6 to the position shown in FIG. 7 by means of a rotary solenoid (not shown). Since the axis of rotation of the striker release pawl 60 is fixed relative to the frame of the machine it can be seen that the tip 61 of the release pawl will move radially outwardly of the striker wheel when it is actuated in a clockwise direction by the rotary solenoid. The radially outward movement of the tip 61 relative to the striker wheel will position the tip such that it will be struck by the radially inwardly extending tail portion 62 of the striker release latch 63 mounted on the rotating striker wheel 22. When struck, the striker release latch 63 will pivot and thereby release its forward tip portion 64 from its engaging relationship with detent shoulder 65 on striker member 24. As soon as the striker member 24 is released from engagement with latch 63 it will move outwardly as shown in FIGS. 7 and 8 due to either centrifugal forces caused by an unbalance of weight in the striker member or by means of a spring loaded plunger 68 (FIG. 5) or both. Due to the extremely short time available for releasing the striker member during less than one revolution of the striker wheel it is preferred to mainly utilize centrifugal force for moving the striker member outwardly.

In order to prepare the machine for the next firing cycle and also to correct the unbalanced condition of the striker wheel which obtains when the striker member 24 is out, the striker member is preferably returned to its retracted position as soon as possible after striking the ball. To permit the striker member to be held in the position to which it is retracted, the rotary solenoid which is used to actuate the striker release pawl 60 is operated only momentarily so that the release pawl will be returned to its normal position out of the path of the latch tail portion 62 by the time the striker retracting mechanism has completed its cycle.

Figure 4:
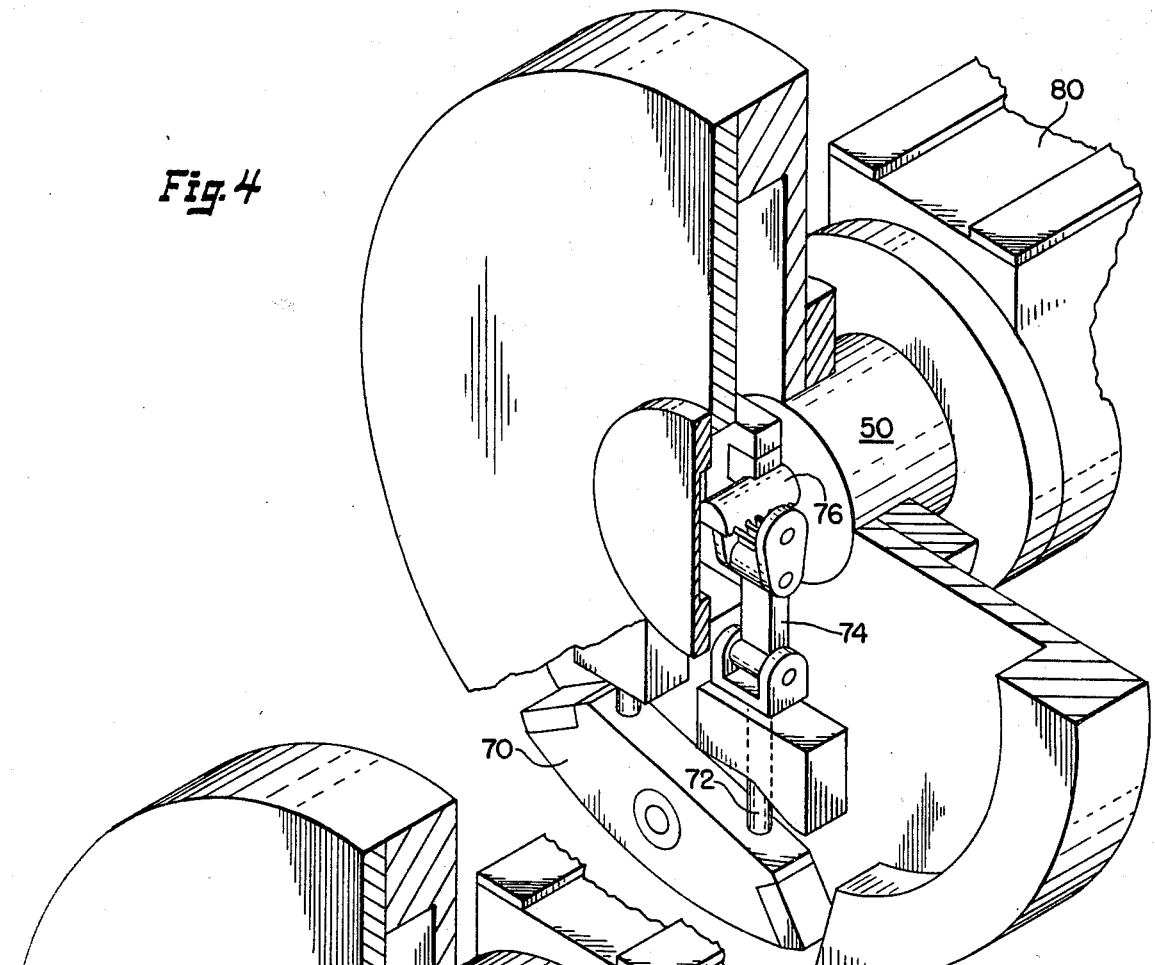
FIG. 4 is a perspective view of the striker retraction mechanism in its retracted position.
Figure 5:
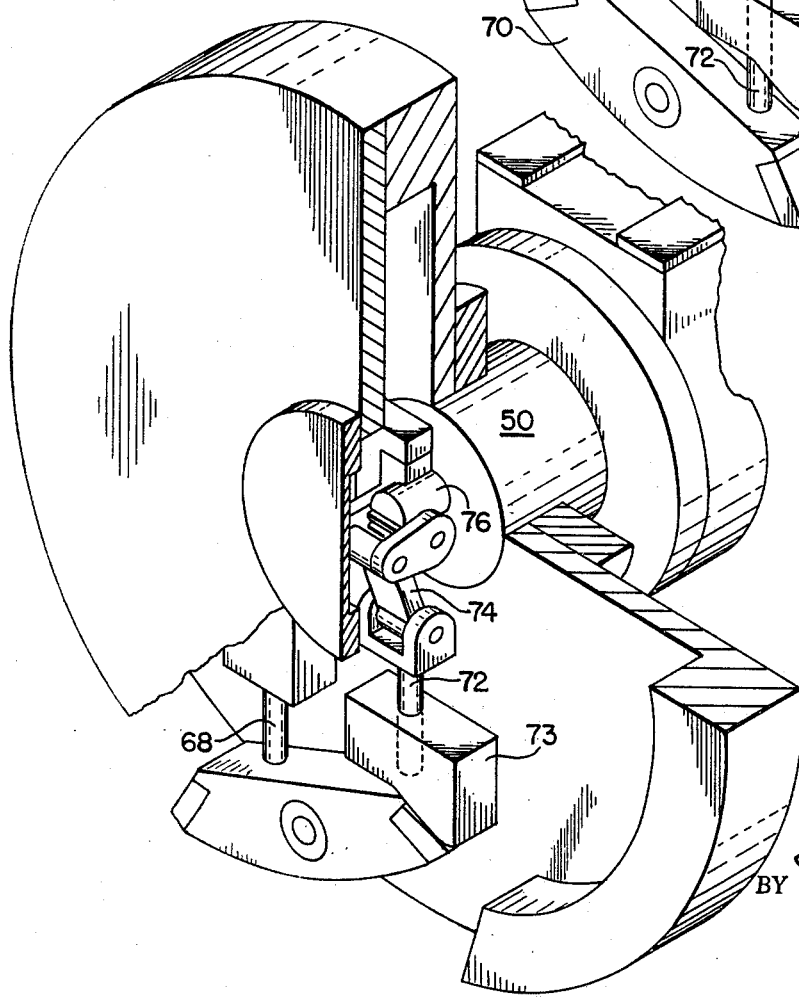
FIG. 5 is a perspective view of the striker retraction mechanism in its released position wherein it is moved into the path of the ball to be tested.

Retraction of the striker member 24 takes place with the mechanism shown in FIGS. 4 and 5. Although the operation of the retraction mechanism is initiated, after a short time delay, with the operation of the "FIRE" button (not shown), the time period required to complete the retraction is sufficiently long so as to insure that the striker member will be in the fully extended position shown in FIGS. 5 and 8 when brought into contact with the ball. The striker member 24 is retracted by a force applied to its inner end 70 by retracting plunger 72 which is reciprocated in plunger support block 73 by means of plunger linkage 74 actuated by axial movement of plunger rod 76. The plunger rod 76 is mounted to and reciprocates with slide 78 which is movable in ways 80 in the striker support housing 52 by means of an eccentric (not shown) attached to a latching motor (not shown) positioned about the ways 80.

The supplying of balls to the machine for testing is accomplished by the ball loading mechanism shown in FIG. 9. This mechanism includes a ball cup 86 preferably made of plastic which is adapted to receive one ball at a time from a feed chute (not shown) which exits to the exterior of the housing at opening 16. During a loading operation, the ball cup is pivoted about axis 90 from its ball receiving position shown in FIG. 9 to a ball discharge position wherein the ball cup is above and adjacent to tee 20. During upward movement of the ball cup during loading a ball support disc 88 fixed for movement with the cup 86 will contact the next ball 15' to be loaded and prevent it from falling out of the feed chute which it is in. The back and forth pivoting of the ball cup 86 and support disc 88 about axis 90 between the receiving and discharge positions is accomplished by means of lever 92 which is eccentrically mounted relative to shaft 94 of a ball loading motor (not shown).

To enable the initial flight trajectory of the ball to be varied so as to maintain a predetermined (preferably centered) vertical position relative to the flight tube 27 regardless of its initial velocity, the tee 20 and thus the ball may be moved forwardly and backwardly a limited amount in the direction of the tube 27 along guideways 100. The movement is preferably provided by a motor and lead screw (not shown). As an aid in determining the exact position of the ball as it passes through the flight tube 27, a calibrating screen 104 may be inserted in the ball receiving chamber 32. The screen 104 is easily made of a penetratable material such as paper. By observing the location of the hole made by a struck ball passing through the screen 104, it is possible to determine the path being followed by the ball so that corrections can be made if necessary. In the event it is desired to test balls of varying diameters the tee 20 may be replaced with one of a different height.

A very important feature of the invention and one which makes the calculation of the coefficient of restitution quite simple is the fact that the length of the ball flight path B between the photobeam 26 and the photoscreen 28 is chosen to be equal in length to the circumference S of the path generated by a striker member in one revolution at its point of contact with the ball. More accurately, the length of path S could be defined as $2\pi$ times the radius of the ball contacting portion of the striker member 24 at the time of impact since the striker member starts to retract after it strikes the ball.

The establishment of ball travel path B as being equal to striker travel path S considerably simplifies the general equation for the coefficient of restitution $e$ which is:

$$e = \frac{V_B}{V_S} - 1$$

where:

$$V_B = \text{Ball flight speed } \frac{B}{T_B}$$

and:

$$V_S = \text{Striker speed } \frac{S}{T_S}$$

Therefore:

$$e = \frac{\frac{B}{T_B}}{\frac{S}{T_S}} - 1$$

but since $B = S$:

$$e = \frac{T_S}{T_B} - 1$$

The preceding equation is only applicable where the mass of the striker member is infinitely greater than the mass of the object struck thereby. These conditions are very closely approximated in the present invention since the striker wheel preferably weighs about 100 pounds whereas the ball weighs only about 1.6 ounces.

Although the invention has been described with respect to its use for determining the coefficient of restitution of a ball, it is also effective for permitting the measurement of other factors which are affected by the manner in which a struck resilient object, such as a golf ball, reacts to impact. Thus, the invention could be described generally as an impact reaction tester rather than merely a device for determining the coefficient of restitution. For example, since the ball length B is fixed, it is possible to program the computer to divide the value of B by the quantity $T_B$ provided by the pulse counter 40 in order to indicate the ball speed ($V_B$) attained by the ball at any predetermined impact velocity ($V_S$). Similarly, the striker S can be indicated at any time by merely actuating the pulse counter 46.

In order to prevent any possibility of damage to the machine or those operating it, it is desirable to utilize conventional control circuitry to insure that the "FIRE" button will not operate until a ball has been loaded and the loading mechanism retracted, as well as to prevent loading from taking place until the "FIRE" button has been operated to cause the striker to be retracted.

While the invention has particularly been shown and described with reference to a preferred embodiment thereof, it will be understood by those skilled in the art that various changes in form and details may be made therein without departing from the spirit and scope of the invention.

What is claimed is:

1. Apparatus for testing the reaction of a resilient body to an impact applied at a predetermined speed, comprising:
    a rotatable driving member;
    driving means for rotating said driving member at a predetermined speed;
    striking means carried by and movable relative to said driving member while said driving member is rotating;
    means for positioning a resilient body in an unrestrained manner adjacent said rotatable driving member;
    means for repetitively moving said striking means while said driving member is rotating from a retracted position wherein it is out of the path of a resilient body on said positioning means into an operative position relative to said body wherein said striking means may strike said resilient body and drive it in a generally tangential path relative to said driving member;

means for measuring the time required for a driven resilient body to travel a predetermined distance;

electrical circuit means for comparing the measured travel time of said driven resilient body to a value indicative of the speed of said striking means; and means associated with said electrical circuit means for indicating the reaction of said resilient body to impacts produced by said striking means.

2. Apparatus for testing the reaction of a ball to an impact applied at any one of a plurality of velocities at which the ball can be driven, comprising:

a rotatable driving member;

driving means for rotating said member at a selected variable speed;

ball striking means in said driving member and movable relative thereto;

means for positioning a ball adjacent said rotatable driving member;

means for repetitively moving said striking means while said driving member is rotating from a retracted position wherein it is out of the path of a ball on said positioning means into an operative position relative to said ball wherein said striking means may strike said ball and drive it in a generally tangential path relative to said driving member;

means for measuring the time required for a driven ball to travel a predetermined distance;

electrical circuit means for comparing the measured travel time of said driven ball to a value indicative of the speed of said ball striking means; and means associated with said electrical circuit means for indicating the reaction of said ball to impacts produced by said striking means.

3. Apparatus for measuring the coefficient of restitution of a resilient ball when subjected to impact at any of a plurality of velocities at which the ball can be driven, comprising:

a rotatable driving member;

driving means for rotating said member at a selected variable speed; ball striking means in said driving member;

means for positioning a ball adjacent said rotatable driving member; means for relatively moving said ball striking means and said ball positioning means relative to each other while said driving member is rotating to permit said ball striking means to strike said ball and drive it in a generally tangential path relative to said driving member;

first means for measuring the time required for a ball driven by said striking means to travel a predetermined distance equal to $2\sigma$ times the radial distance of the ball striking means from the axis of the driving member at the point of impact;

means for producing a first electrical signal which is directly related to the time interval measured by said first measuring means;

means for producing a second electrical signal which corresponds to the time interval required for one revolution of said driving member;

electrical circuit means for comparing said first and second electrical signals and producing a third electrical signal corresponding to the result produced by dividing said second electrical signal by said first electrical signal and subtracting the quantity 1 therefrom; and means for receiving said third electrical signal and converting it into a display indicative of the coefficient of restitution of the ball for the selected velocity of impact.

4. Apparatus in accordance with claim 3, further characterized in that said means for producing a second electrical signal comprises second measuring means for measuring the time interval required for one revolution of said driving member.

5. Apparatus in accordance with claim 4, and further characterized in that said first and second measuring means comprise first and second pulse counters respectively, said second pulse counter being activated to permit counting when said first pulse counter is activated by the passage of a struck ball past a light beam.

6. Apparatus in accordance with claim 1 wherein said means for measuring the time of travel of a resilient body through a predetermined distance comprises light beam means, light screen means spaced from said light beam means by said predetermined distance, and a pulse counter for counting time pulses during the interval in which the resilient body travels said predetermined distance.

7. Apparatus in accordance with claim 6 wherein said predetermined distance is equal to $2\pi$ times the radial distance of the movable striking means from the axis of the driving member at its point of impact with the body.

8. Apparatus in accordance with claim 1 wherein said means for positioning comprises a tee which is mounted for adjustable movement in a generally horizontal direction to permit the point of impact of the striking means with the resilient body to be altered whereby to change the initial flight trajectory of the body after impact.

9. Apparatus in accordance with claim 8 and further including a replaceable calibrating screen adapted to be mounted in the path of the resilient body and pierced thereby for indicating the position of the body.

10. Apparatus in accordance with claim 1 wherein said movable striking means comprises a striker member pivotally mounted on said driving member, latch means for normally retaining said striker member in a retracted position, and actuating means for releasing said latch means and permitting said striker member to move to its operative position.

11. Apparatus in accordance with claim 10 and further including retracting means for retracting said striker member from its operative position and retaining it in its retracted position.

12. Apparatus in accordance with claim 1 wherein said means for positioning includes a rotary loading mechanism, said loading mechanism being adapted to receive a resilient body to be tested, to carry it to and drop it on a tee, and to return to a loading position for receipt of another body.

References Cited

UNITED STATES PATENTS

| 3,299,692 | 1/1967 | Mizejewski | 73—13 |
| 2,783,999 | 3/1957 | Simjian | 273—181 |
| 2,314,063 | 3/1943 | Anderson | 73—13 |

RICHARD C. QUEISSER, Primary Examiner

J. WHALEN, Assistant Examiner

U.S. Cl. X.R.

124—1